(12) United States Patent
Oh

(10) Patent No.: US 11,377,097 B2
(45) Date of Patent: Jul. 5, 2022

(54) SYSTEM, METHOD, INFRASTRUCTURE, AND VEHICLE FOR AUTOMATED VALET PARKING

(71) Applicants: HYUNDAI MOTOR COMPANY, Seoul (KR); KIA MOTORS CORPORATION, Seoul (KR)

(72) Inventor: Tae Dong Oh, Suwon-si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 57 days.

(21) Appl. No.: 16/729,925

(22) Filed: Dec. 30, 2019

(65) Prior Publication Data

US 2020/0207335 A1    Jul. 2, 2020

(30) Foreign Application Priority Data

Dec. 31, 2018 (KR) .................. 10-2018-0173384

(51) Int. Cl.
*B60W 30/06* (2006.01)
*B62D 15/02* (2006.01)
*G05D 1/02* (2020.01)

(52) U.S. Cl.
CPC ......... *B60W 30/06* (2013.01); *B62D 15/0285* (2013.01); *G05D 1/0212* (2013.01); *G05D 1/0236* (2013.01); *G05D 1/0248* (2013.01); *G05D 2201/0213* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,657,817 | B2* | 5/2020 | Schoenherr | B60W 40/068 |
| 10,735,991 | B1* | 8/2020 | Kothari | H04W 28/20 |
| 2004/0236470 | A1* | 11/2004 | Dooley | G05D 1/0238 |
| | | | | 700/255 |
| 2010/0156672 | A1* | 6/2010 | Yoo | G08G 1/14 |
| | | | | 340/932.2 |
| 2011/0102197 | A1* | 5/2011 | Herwich | E01F 9/559 |
| | | | | 340/932.2 |
| 2017/0309177 | A1* | 10/2017 | Hoffmann | G08G 1/146 |
| 2018/0072345 | A1* | 3/2018 | Nicodemus | G08G 1/168 |
| 2018/0288785 | A1* | 10/2018 | Guo | H04L 41/12 |
| 2019/0088135 | A1* | 3/2019 | Do | G08G 1/163 |
| 2020/0209886 | A1* | 7/2020 | Lee | G05D 1/0276 |

FOREIGN PATENT DOCUMENTS

| | | |
|---|---|---|
| DE | 10 2012 222 562 A1 | 6/2014 |
| FR | 3 032 410 | 8/2016 |
| WO | 2017-057053 A1 | 4/2017 |

OTHER PUBLICATIONS

Extended European Search Report dated May 11, 2020 from the corresponding European Application No. 19220109.3, 12 pp.

* cited by examiner

*Primary Examiner* — Jeff A Burke
*Assistant Examiner* — Madison B Emmett
(74) *Attorney, Agent, or Firm* — Fox Rothschild LLP

(57) ABSTRACT

An automated valet parking method and an apparatus thereof are provided. The method includes transmitting a target position and a guide route from a parking infrastructure to a vehicle, performing autonomous driving toward the target position along the guide route; performing autonomous parking at the target position.

17 Claims, 11 Drawing Sheets

| Step | Infra | Vehicle |
|---|---|---|
| <1> AVPS START | • Recognize and qualify an appropriate user (by user ID and PW) and vehicle (by unique number assigned to vehicle)<br>• Manage driving authority (receiving driving authority from the user/return the driving authority to the user)<br>• Transmit automated driving start instruction to vehicle | • Perform engine ON/OFF or power ON/OFF according to the instruction of infra<br>• Lock the vehicle according to the instruction of infra |
| <2> DETERMINATION OF TARGET POSITION AND GUIDE ROUTE | • Determine the target position, guide route, and permissive driving area, and deliver these information to vehicle | |
| <3> AUTONOMOUS DRIVING | • Instruct automated driving (start, stop, re-start) to vehicle | • Drive along the guide route designated by infra within the permitted driving area at a speed of 10km/h or less<br>• Drive within the path and width designated by infra without deviation<br>• Drive along a curve with the minimum turn radius of the vehicle designated by the infra without deviation<br>• Drive on a path with the gradient less than or equal to the maximum gradient designated by infra |
| <4> POSITION MEASUREMENT (vehicle, obstacle) | • Be aware of and manage vehicle location<br>• Detect and recognize vehicles and obstacles (TBD) and monitor safety driving and parking operation of each vehicle (supervise) | • Estimate its own position<br>• Informs the infra of its estimated position / with the accuracy and frequency specified below (TBD)<br>• Inform the infra of its own status<br>• Detect the following obstacles (TBD) |
| <5> AUTONOMOUS PARKING | | • Park and stop the vehicle at the target position designated by infra (equivalent to PAPS parking requirements) |

Fig. 4A

| Step | Infra | Vehicle |
|---|---|---|
| <6> EMERGENCY BRAKE | • Continue to instruct automated driving to vehicle when safety is ensured as a result of safety confirmation, and to instruct the vehicle to perform an emergency stop, if safety is not confirmed | • Start/emergency stop/re-start automated driving according to the instruction of infra<br>• Perform an emergency stop in case where a potential hazard is determined as a result of the detection mentioned above<br>• Immediately decelerate at the rate of (TBD) m/s² and stop, when the following conditions are met<br>(1) vehicle received an instruction from infra for E/S<br>(2) vehicle detected an obstacle (TBD)<br>• After coming to a stop, the vehicle shall remain stopped until it receives an instruction from infra to resume automated driving<br>• Vehicle shall re-start suspended driving or parking when it receives an instruction to start automated driving from the infra after confirming that there is no obstacle ahead in the path |
| <7> AVPS END | • After the vehicle completes automated driving and parking, the infra transmits vehicle control release instruction to the vehicle | • Perform engine ON/OFF or power ON/OFF according to the instruction of infra<br>• Lock the vehicle according to the instruction of infra<br>• Mechanically fix or restrain wheels using such as the parking brake |
| <8> FAULT CONTROL (communication or vehicle fault) | • Detect communication faults between the infra and vehicle | • Detect faults in communication with infra during driving<br>• Detect vehicle's faults (e.g., part failure, human or animal remaining inside the vehicle, etc)<br>• Perform emergency stop when above fault is detected<br>• After coming to a stop, the vehicle shall remain stopped until it receives an instruction from infra to resume automated driving |

Fig. 4B

| DATA | Contents | Transmit (T)/ Receiver (R) | | Regularly(R)/ Event(E) Transmission | Note |
|---|---|---|---|---|---|
| | | Infrastructure | Vehicle | | |
| (1) Vehicle qualification information | ID number (VIN) to identify each vehicle | R | T | When entering the parking | |
| (2) Automated driving preparation instruction | — | T | R | Right before automated driving start | |
| (3) Vehicle information response | Vehicle state (normal stop/ driving/emergency stop, etc.)/Vehicle position(physical) | R | T | F (1 Hz) | This is also used for common unication fault check by the e vehicle |
| (4) Vehicle information response | — | R | T | F (1 Hz) | |
| (5) Target position · guide route Delivery | Target position: Passing point location/Permitted time to pass through the point e (Maximum speed) | T | R | After automated driving in struction | |
| (6) Driving boundaries delivery | A group of lines to surround the permitted driving ar ea | T | R | after automated driving preparation instruction | |
| (7) Automated driving start instruction | — | T | R | After delivery of guide rout e and driving boundaries, when restarting after emer gency stops | |
| (8) Emergency stop instruction | — | T | R | E | |
| (9) Vehicle control release instruction | — | T | R | E | |

Fig. 5

SYSTEM, METHOD, INFRASTRUCTURE, AND VEHICLE FOR AUTOMATED VALET PARKING

CROSS-REFERENCE TO RELATED APPLICATION

The present application claims priority to and the benefit of Korean Patent Application No. 10-2018-0173384, filed on Dec. 31, 2018, which is incorporated herein by this reference in its entirety.

TECHNICAL FIELD

The present disclosure relates to a system, method, infrastructure, and vehicle for performing automated valet parking. The present disclosure enables an unmanned vehicle to autonomously move to and park at an empty parking space by communicating with a parking infrastructure. The present disclosure enables an unmanned vehicle to autonomously move from a parking space to a pickup zone by communicating with a parking infrastructure.

BACKGROUND

The statements in this section merely provide background information related to the present disclosure and may not constitute prior art.

Many modern cities suffer from various parking-related issues. For example, there is a high risk of a car collision in a parking lot. For parking in crowded places such as large shopping centers, it takes long time and much energy to park a vehicle due to traffic congestion before entering a parking lot. In addition, it takes long time and much energy to locate an empty parking space even after entering a parking lot. In addition, there is inconvenience that a driver has to move to a spot at which his or her vehicle is parked at the time of leaving the visited area or that a driver often has difficulty in retrieving his or her vehicle without remembering the place where his or her vehicle is parked.

SUMMARY

The present disclosure provides an automated valet parking service by which a driver can leave his or her vehicle at a predetermined drop-off zone and the vehicle without the driver seated autonomously moves to and parks at an empty parking space within a parking lot.

The present disclosure also provides an automated valet parking service by which a vehicle that has been parked autonomously moves from a parking space to a predetermined pickup zone so that the driver can conveniently leave the parking lot.

In one aspect of the present disclosure, an automated valet parking method includes: preparing for an automated valet parking procedure; transmitting, by a parking infrastructure, a target position and a guide route to a vehicle; performing, by the vehicle, autonomous driving to the target position according to the guide route; performing, by the vehicle, autonomous parking at the target position; and finishing the automated valet parking procedure, in which the guide route includes a light ray emitted from a light-emitting device installed in the parking lot and the vehicle detects the light ray with a built-in sensor.

In another aspect of the present disclosure, an apparatus for automated valet parking includes a processor configured to perform computations and a light-emitting device configured to emit a light ray. The processor provides a guide route that guides the vehicle to perform autonomous valet parking to a target position and controls a light-emitting device according to the guide route and the light-emitting device emits a light ray under control of the processor.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIGS. 4A and 4B are diagrams illustrating operations performed by a parking infrastructure and a vehicle for automated valet parking in one form of the present disclosure;

FIG. 5 is a diagram illustrating a communication process performed by a vehicle and a parking infrastructure for automated valet parking in one form of the present disclosure;

Figure 1:
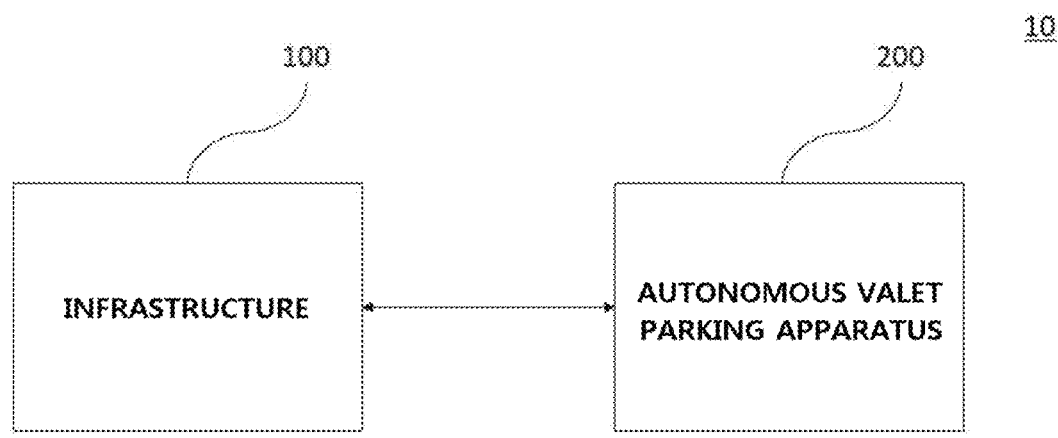
FIG. 1 is a diagram illustrating an automated valet parking system in one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It is also noted that terms used in the detailed description of the present disclosure are defined below.

The term "driver" refers to a person who uses an automated valet parking service provided by an automated valet parking system.

The term "driving authority" refers to the authority to perform vehicle operations. The term "vehicle operation"

refers to an operation such as steering, accelerating, braking, gear shifting, vehicle starting, and door locking and unlocking of a vehicle.

The term "vehicle" refers to a vehicle having an autonomous valet parking feature.

The term "electric vehicle" refers to a vehicle that is driven by an electric motor that can be recharged in a cable plugging manner or a wireless charging manner.

The term "control center" refers to a facility that can monitor vehicles parked in a parking garage or facility, which determines a target position, a guide route, and a permitted driving area, and which transmits a driving start command or an emergency stop command to a vehicle.

The term "infrastructure" refers to a parking facility or sensors installed in the parking facility. Alternatively, in some cases, the term "infrastructure" may refer to a control center that controls a parking lot gate, vehicles in a parking lot, etc.

The term "target position" refers to an empty space available for parking. Alternatively, in a case where drivers leave a parking lot, the term "target position" may refer to a pickup area where the drivers get in their vehicles. Alternatively, the "target position" refers to a wireless-rechargeable parking slot equipped with a wireless charging system for wirelessly recharging a power source of a vehicle. For example, the target position may be a parking slot in which an electromagnetic induction coil is buried under the ground or is installed on the ground within the parking slot.

The term "guide route" refers to a route along which a vehicle drives to reach a target position. For example, in a case of performing parking, the guide route refers to a route along or according to which a vehicle needs to navigate from a drop-off area to an empty space. For example, the guide route is provided in the form of instructions, for example, "driving forwards a distance of 50 m and turning left at the corner". Alternatively, the guide route is a route extending from a drop-off point to a wireless-rechargeable parking slot.

The term "driving route" refers to a driving path along which a vehicle drives.

The term "permitted driving area" refers to an area where a vehicle can drive in a parking lot. For example, the permitted driving area includes the driving route. The permitted driving area is defined with barrier walls, parked vehicles, parking lines, etc.

FIG. 1 is a diagram illustrating an automated valet parking system in some forms of the present disclosure. Referring to FIG. 1, an automated valet parking system 10 includes a parking infrastructure 100 and an autonomous valet parking apparatus 200.

The infrastructure 100 refers to an apparatus, facility or system for operating, managing, and controlling the automated valet parking system. For example, the infrastructure 100 may be a parking facility. In some forms of the present disclosure, the infrastructure 100 includes sensors, communication devices, alarm devices, display devices, and a server that controls those devices and sensors. Alternatively, in some cases, the term "infrastructure" may refer to a control center that controls a parking lot gate, vehicles in a parking lot, etc.

The infrastructure 100 includes a transceiver for performing communication and a processor for performing computation. In some forms of the present disclosure, the infrastructure 100 may further include sensors for detecting nearby objects and surrounding parameters. In the present disclosure, determinations and computations performed by the infrastructure 100 are performed by the processor.

The autonomous valet parking apparatus 200 refers to a vehicle that can perform autonomous valet parking. In some forms of the present disclosure, the autonomous valet parking apparatus 200 refers to a component or a set of components capable of performing autonomous valet parking.

Figure 2:
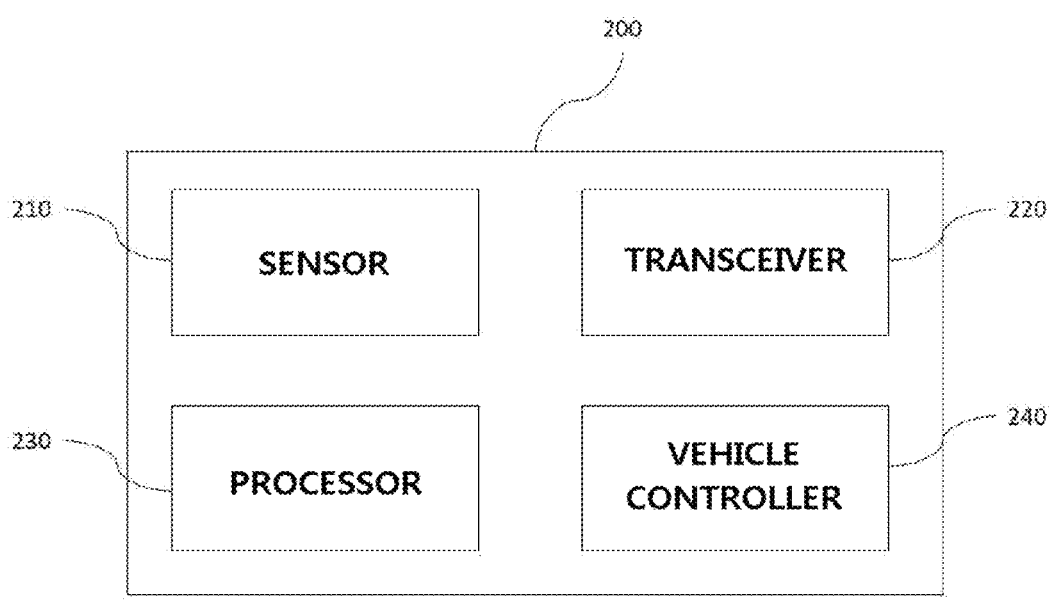
FIG. 2 is a diagram illustrating an autonomous valet parking apparatus in one form of the present disclosure.

FIG. 2 is a diagram illustrating an autonomous valet parking apparatus in some forms of the present disclosure. Referring to FIG. 2, the autonomous valet parking apparatus (for example, vehicle 200) includes a sensor 210, a transceiver 220, a processor 230, and a vehicle controller 240.

The sensor 210 monitors the surroundings of the autonomous valet parking apparatus 200. In some forms of the present disclosure, the sensor 210 measures the distance between the autonomous valet parking apparatus 200 and a specific object or detects a nearby object. For example, the sensor 210 includes at least one of the sensors selected from among an ultrasonic sensor, a RADAR sensor, a LIDAR sensor, a camera, an infrared sensor, a thermal sensor, and a millimeter wave sensor.

The sensor 210 transmits data resulting from sensing or measuring to the transceiver 220 or to the vehicle controller 230.

The transceiver 220 exchanges data with the infrastructure 100. This communication is called vehicle-to-infra (V2I) communication. The transceiver 220 communicates the data with other vehicles. This communication is called vehicle-to-vehicle (V2V) communication. The V2I communication and the V2V communication are collectively called vehicle-to-everything (V2X) communication. In some forms of the present disclosure, the transceiver 220 receives data such as a target position, a guide rote, a driving route, an instruction, etc. from the infrastructure 100, processes the received data, and transmits the processed data to the processor 230. The transceiver 220 transmits data collected and generated by the vehicle 220 to the infrastructure 100. In some forms of the present disclosure, the transceiver 220 exchanges data with a terminal device of the driver of the vehicle 200.

The transceiver 220 receives and transmits data by using a wireless communication protocol or a cable communication protocol. Examples of the wireless communication protocol include, but are not limited to, wireless LAN (WLAN), digital living network alliance (DLNA), wireless broadband (Wibro), world interoperability for microwave access (Wimax), global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSPDA), high speed uplink packet access (HSUPA), IEEE802.16, long term evolution (LTE), long term evolution-advanced (LTE-A), wireless mobile broadband service (WMBS), Bluetooth, infrared data association (IrDA), ultra-wideband (UWB), ZigBee, near field communication (NFC), ultra sound communication (USC), visible light communication (VLC), Wi-Fi, and Wi-Fi direct. Examples of the cable communication protocol include, but not limited to, wired local area network (LAN), wired wide area network (WAN), power line communication (PLC), USB communication, Ethernet communication, serial communication, and optical/coaxial cable communication. Other protocols that support communication between devices fall within the definition of the communication protocol that is used in some forms of the present disclosure.

The processor 230 controls the overall operation of the vehicle 200. The processor 230 controls the vehicle controller 240 on the basis of the data transmitted from the sensor 210 and the transceiver 220. In some forms of the present disclosure, the processor 230 generates a control signal for adaptively controlling the vehicle controller 240 according to the data transmitted from the infrastructure 100 and transmits the control signal to the vehicle controller 240.

That is, the processor 230 refers to a device that performs a series of computations or makes a series of determinations to control the vehicle 200 for the purpose of autonomous valet parking. The processor 230 may be a processor by which a program including instructions for performing automated valet parking is executed. Examples of the processor 230 include a central processing unit (CPU), a microcontroller unit (MCU), an application specific integrated circuit (ASIC), a field programmable gate array (FPGA), and a graphic processing unit (GPU) but are not necessarily limited thereto.

The vehicle controller 240 controls the operation of the vehicle 200 according to the control signal issued by the processor 230. In some forms of the present disclosure, the vehicle controller 240 controls the vehicle 200 in response to the control signal transmitted from the processor 230. For example, the vehicle controller 240 controls various vehicle operations such as driving, stopping, resuming of driving, steering, accelerating, decelerating, parking, lamp lighting, alarm sounding, etc.

That is, it will be appreciated that the vehicle controller 240 can perform all the functions for controlling the operations of the vehicle 200. That is, the vehicle controller 240 may include a driving unit, a braking unit, a steering unit, an acceleration unit, an alarm unit, and a lighting unit.

On the other hand, although not described herein, the operations and/or functions of the vehicle 200 described in the description herein are performed by the conjunction of one or more components selected from among the sensor 210, the transceiver 220, the processor 230, and the vehicle controller 240.

Figure 3:
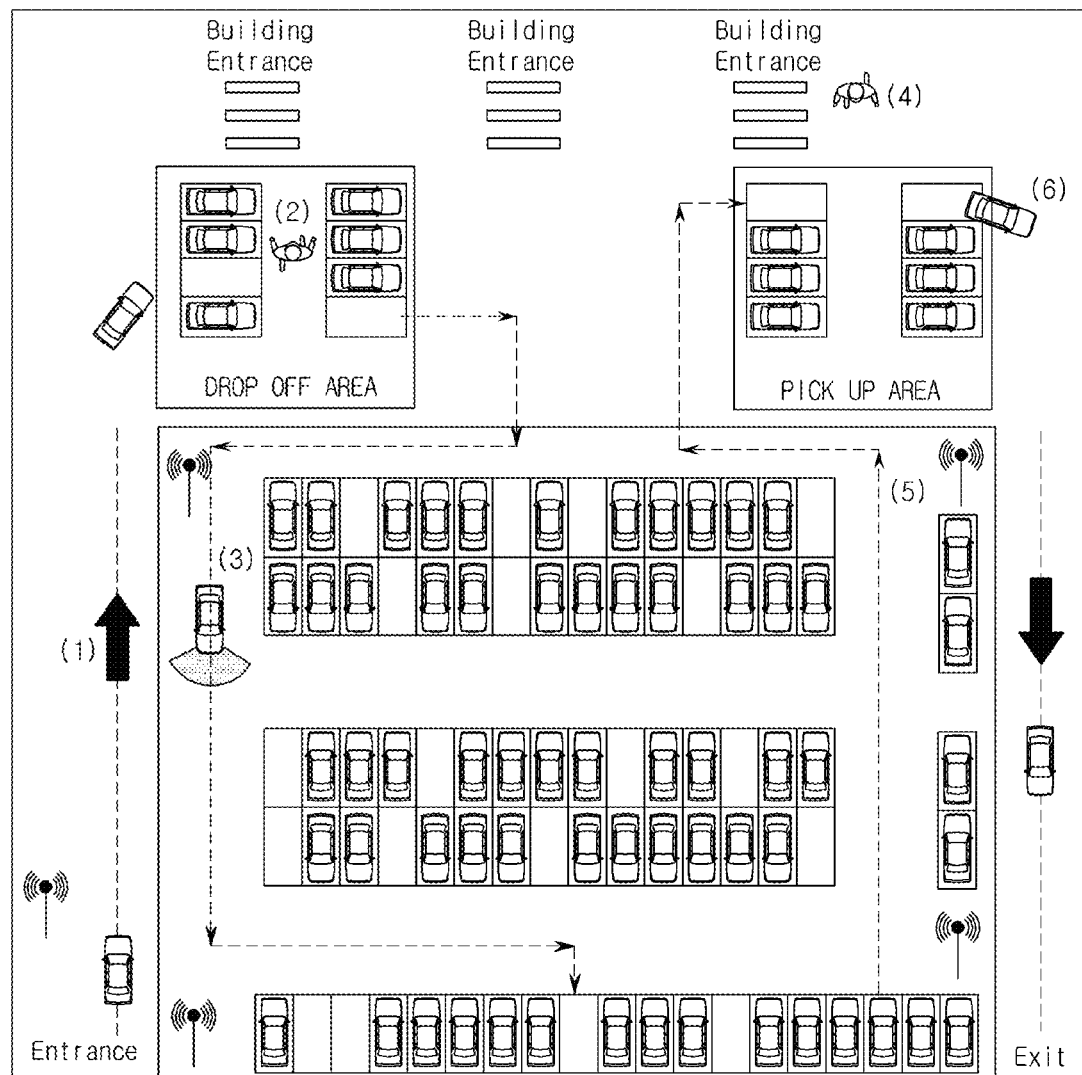
FIG. 3 is a conceptual diagram illustrating an automated valet parking system and method in one form of the present disclosure.

FIG. 3 is a conceptual diagram illustrating an automated valet parking system and method in some forms of the present disclosure.

Referring to FIG. 3, in step (1), a driver drives a vehicle to a drop-off zone in a parking lot.

In step (2), the drivers leave the vehicle at the drop-off zone and the authority to drive or control the vehicle is delegated to the infrastructure.

In step (3), the infrastructure searches for empty parking slots among all the parking slots in the parking lot and assigns a suitable empty parking slot among the empty parking slots to the vehicle. The infrastructure determines a guide route which guides the vehicle to the assigned empty parking slot. After the parking slot and the guide route are determined, the vehicle autonomously drives along the guide route to reach the assigned parking slot and performs autonomous parking at the parking slot.

In step (4), the driver moves to a pickup zone where the vehicle will pick up the driver when the driver wants to leave the parking lot.

In step (5), the infrastructure determines a suitable target position. For example, the suitable target position may be an empty parking slot of multiple parking slots within the pickup zone. The infrastructure determines a guide route which leads the vehicle to the target position. After the target position and the guide route are determined and transmitted to the vehicle, the vehicle autonomously drives along the guide route to reach the target position and performs autonomous parking.

In step (6), the driver arrives at the pickup zone and takes over the authority to drive the vehicle. The driver drives the vehicle toward the exit of the parking lot.

FIGS. 4A and 4B are diagrams illustrating operations performed by a parking infrastructure and a vehicle for automated valet parking in some forms of the present disclosure.

In step (1), operations of the infrastructure and the vehicle to start automated valet parking are performed. The infrastructure identifies the driver and the vehicle and determines whether the driver and the vehicle are qualified. For example, the infrastructure determines whether the driver is a qualified driver by reading an identification number (ID) or a password input by the driver. In addition, the infrastructure determines whether the vehicle is a qualified vehicle by reading to a vehicle identification number thereof. The vehicle can turn on and off the engine by itself. The vehicle can turn on and off the power supply by itself. For example, a state in which the engine of the vehicle is turned off and the power supply is turned on is referred to as an accessory-on (ACC-On) state. The engine on/off and the power supply on/off of the vehicle are performed according to instructions transmitted from the infrastructure or automatically performed without depending on the instructions transmitted from the infrastructure. The vehicle can lock and unlock the doors by itself. The locking/unlocking of the vehicle doors is performed according to instructions transmitted from the infrastructure or is automatically performed without depending on the instructions from the infrastructure. When the vehicle proceeds to an autonomous parking step, it is preferable to lock the vehicle doors. In addition, the authority to drive the vehicle is delegated to the infrastructure from the vehicle. The driving authority means an authority to control vehicle operations. The vehicle operations include steering, accelerating, braking, gear shifting, ignition turning, and door locking and unlocking. Since the driving authority is delegated to the infrastructure, the infrastructure takes complete control of the vehicle during the automated valet parking of the vehicle. Accordingly, the likelihood that an unintended operation of the vehicle occurs is lowered and vehicle accidents in the parking lot are prevented. However, in some cases, the driving authority may be partially delegated to the infrastructure so that the vehicle can still control some of the vehicle operations, or the driving authority may be shared by the vehicle and the infrastructure. For example, a braking operation may be performed when an emergency occurs during the autonomous valet parking procedure. Therefore, it is preferable for the vehicle to apply a brake without intervention of the infrastructure when the vehicle senses a danger with help of an ADAS sensor. In addition, the vehicle checks whether a person or animal is present in the vehicle. Since a parking duration from the completion of the autonomous valet parking to the discharging of the vehicle from a parking lot is long, if a person or animal is accidently left in the vehicle, the person or animal would be in danger. Therefore, it is important to ensure that the vehicle is empty before the vehicle is parked. Whether a person or animal is present in the vehicle may be checked with a sensor mounted on the vehicle.

In some forms of the present disclosure, the infrastructure sets a plurality of (i.e., n) time frames for a plurality of vehicles, respectively. For example, when three vehicles enter a parking lot, the three vehicles are allocated with a first time frame, a second time frame, and a third time frame, respectively. The n time frames are used by the vehicles distinguish their guide route transmitted from the infrastructure from the others.

In step (2), a process of determining a target position, a guide route, and a driving route is performed. The determination of the target position, the guide route, and the driving route is performed by the infrastructure. The target position, the guide route, and the driving route determined by the infrastructure are delivered from the infrastructure to the vehicle.

The target position is a final destination to be reached by the vehicle. When a vehicle enters a parking lot, the target position may be an empty parking slot in a normal parking zone in the parking lot. When a vehicle exits a parking lot, the target position may be an empty parking slot in a pickup zone in the parking lot. Alternatively, the target position may be a specific spot in the vicinity of an empty parking slot. For example, when there are several successive empty parking slots in a specific area of the parking lot, the target position may be a specific spot in the vicinity of the specific area having the empty parking slots. In this case, the vehicle autonomously drives to the specific spot, and the autonomous parking function of the advanced driver-assistance system (ADAS) mounted in the vehicle is activated so that the vehicle can be parked in a desired parking slot in the vicinity of the specific spot. The autonomous parking function of the ADAS may be a partially automated parking system (PAPS). In this case, the efficiency of management of available parking spaces can be improved. In this case, it is not necessary for the infrastructure to accurately calculate the target position. That is, only rough estimation for the target position is required. Therefore, it is possible to reduce computing resources for data processing.

The guide route is a path along which the vehicle needs to autonomously drive in the parking lot. The guide route is provided to the vehicle in the form of a series of instructions, such as driving forwards 10 meters straight, turning right at the first corner, driving forwards 20 meters straight, turning left, etc. Alternatively, the guide route is provided to the vehicle in the form of lines including straight lines and curved lines drawn on a parking lot map. The lines indicate a driving lane extending from the current location of the vehicle to the target position on the parking lot map. Alternatively, the guide route is composed of multiple waypoints and one target position marked on a parking lot map. For example, the guide route includes three pillars A1, B2, and C3 as the multiple waypoints and a parking slot D23 as the target position. When the guide route is expressed in the form of multiple waypoints and a target position, information on straight and/or curved lines and distances (for example, 10 m) is not required. Therefore, this guide route reduces the amount of information for V2I communication.

In some forms of the present disclosure, the guide transmitted to the vehicle may be composed of light-emitting devices. For example, the light-emitting devices are LED lamps. When the light-emitting devices illuminate, the guide route is displayed on the ground surface. In this case, the light-emitting devices are LED lamps that are buried in the ground of the parking lot. Alternatively, the light-emitting devices may be laser lamps installed on the ceiling, the wall surface, or pillars in a manner that the laser lamps emit a laser beam toward the ground surface of the parking lot. The vehicle detects illumination of the light-emitting devices with built-in sensors, thereby receiving or recognizing the guide route. For example, the vehicle may detect illumination of each of the light-emitting devices with the use of a front camera sensor.

In step (3), an autonomous driving operation is performed in the parking lot. The autonomous driving of the vehicle includes driving, stopping, and re-driving. The autonomous driving of the vehicle is performed according to instructions transmitted from the infrastructure to the vehicle. Alternatively, the autonomous driving of the vehicle may be performed without relying on the instructions transmitted from the infrastructure. The vehicle can autonomously drive to the target position along the guide route within a permitted driving area. During the driverless autonomous driving of the vehicle, the vehicle is controlled to drive at a preset speed or below. This preset speed may be a value transmitted from the infrastructure to the vehicle or may be a value stored in the vehicle. In addition, the vehicle is controlled not to deviate beyond an error margin of the given guide route when driving along the guide route. This preset error margin may be a value transmitted from the infrastructure to the vehicle or may be a value stored in the vehicle. In addition, the vehicle may turn with a predetermined minimum turning radius when it is necessary to turn during the autonomous driving along the guide route. This preset minimum turning radius may be a value transmitted from the infrastructure to the vehicle or may be a value stored in the vehicle. The vehicle is controlled not to exceed a predetermined maximum acceleration value when autonomously driving along the guide route. This preset maximum acceleration value may be a value transmitted from the infrastructure to the vehicle or may be a value stored in the vehicle.

In step (4), a position measurement operation is performed. The target of the position measurement may be a vehicle to be parked in a parking lot, an obstacle existing in the parking lot, or a vehicle that is already parked in the parking lot. The infrastructure measures the position of the vehicle or the obstacle and stores the measured position in a database. The infrastructure identifies and detects vehicles or obstacles and monitors the safety of each of the plurality of vehicles in the parking lot. In addition, the infrastructure monitors the operating state of the vehicle that is performing autonomous parking after reaching the target position and transmits an instruction on the basis of the results of the monitoring. The vehicle measures its position on its own. The vehicle transmits the measured position to the infrastructure. The error of the position measured by the vehicle needs to be within a predetermined error range. The predetermined error range is determined by the infrastructure. The vehicle detects obstacles present around the vehicle, measures the positions of the obstacles, and transmits the measured positions of the respective obstacles to the infrastructure. The communication between the vehicle and the infrastructure is performed at a predetermined frequency.

In step (5), an autonomous parking operation is performed by the vehicle. The autonomous parking refers to an operation in which the vehicle that has reached around the target position driverlessly goes into a target parking slot. The vehicle performs autonomous parking by sensing nearby obstacles or nearly vehicles that are parked, with the help of a distance sensor mounted on the vehicle. Examples of the distance sensor mounted on the vehicle include an ultrasonic sensor, a RADAR sensor, a LIDAR sensor, and a camera.

In step (6), an emergency braking process is performed. The emergency braking of the vehicle is performed according to instructions transmitted from the infrastructure or may be performed on its own when the vehicle detects an obstacle. The infrastructure instructs the vehicle to apply an emergency brake when it is determined that an area around the vehicle is unsafe. When the infrastructure determines that the surroundings of the vehicle become safe after the emergency braking is performed, the infrastructure orders the vehicle to resume autonomous driving or autonomous parking. When the vehicle detects an obstacle, the vehicle applies an emergency brake on its own. In addition, the vehicle reports to the infrastructure of the emergency braking that is performed by itself or the type or location of an obstacle which is the cause of the emergency braking. The vehicle reduces its speed according to a predetermined deceleration value preset for the emergency braking. This predetermined deceleration value is a value determined by the infrastructure or a value stored in the vehicle. The predetermined deceleration value may be determined according to the type of an obstacle, the position of an obstacle, and the distance between the vehicle and an obstacle. The vehicle resumes autonomous driving or autonomous parking upon receiving a resumption instruction for the autonomous driving or autonomous parking from the infrastructure. Alternatively, the vehicle resumes the autonomous driving or autonomous parking when it confirms that the obstacle is removed. The vehicle reports to the infrastructure of the resumption of autonomous driving or autonomous parking and of the removal of the obstacle.

In step (7), the automated valet parking procedure is finished. After the vehicle has completed autonomous driving and autonomous parking, the infrastructure issues a control release instruction to the vehicle. The vehicle can turn on and off the engine and turn on and off the power supply according to instructions received from the infrastructure or without depending on the instructions from the infrastructure. In addition, the vehicle can lock and unlock the vehicle doors according to instructions received from the infrastructure or without depending on the instructions from the infrastructure. Further, the vehicle can apply a parking brake according to instructions received from the infrastructure or without depending on the instructions from the infrastructure.

In step (8), an error control operation is performed. The error control is performed when an error occurs in communication between the vehicle and the infrastructure and/or when a mechanical error of the vehicle occurs. The infrastructure monitors communication between the infrastructure and the vehicle to detect whether a communication error occurs. The vehicle detects a communication error by monitoring the communication between the infrastructure and the vehicle. The vehicle detects whether a mechanical error occurs by monitoring operating states of built-in accessories including sensors mounted thereon. The vehicle detects the presence of a person or animal in the vehicle and applies an emergency brake when the presence of a person or animal is detected. The vehicle resumes autonomous parking or autonomous driving according to instructions received from the infrastructure when the vehicle is in an emergency stop state. Alternatively, the vehicle may determine, by itself, whether the cause of the emergency braking is removed and resumes autonomous parking or autonomous driving when the cause of the emergency parking is removed.

FIG. 5 is a diagram illustrating a communication process performed by a vehicle and a parking infrastructure for automated valet parking in some forms of the present disclosure.

In step (1), vehicle qualification information is delivered from the vehicle to the infrastructure. The vehicle qualification information includes an identifier that distinguishes each vehicle from the other vehicles. For example, the vehicle qualification information may be a unique vehicle number (for example, license plate number) of the vehicle. The vehicle qualification information is transmitted at a stage in which the autonomous valet parking procedure is started after the vehicle enters a parking lot and (see (1) of FIG. 4A).

In step (2), an autonomous valet parking preparation instruction is transmitted from the infrastructure to the vehicle. The autonomous valet parking preparation instruction is transmitted before the autonomous driving of the vehicle begins.

In step (3), vehicle information is transmitted from the vehicle to the infrastructure. The vehicle information includes state information of the vehicle and position information of the vehicle. The state information of the vehicle includes whether the vehicle is driving, whether the vehicle is stopped, or whether the vehicle is in an emergency stop state. The vehicle information is transmitted periodically at a specific frequency (for example, 1 Hz which means once per second). The vehicle information is used as a parameter to determine whether a communication error has occurred between the vehicle and the infrastructure. For example, when the vehicle information does not reach the infrastructure at a specific time that is estimated according to the communication frequency, the infrastructure determines that an error has occurred in communication between the vehicle and the infrastructure.

In step (4), an acknowledgement of the reception of the vehicle information is transmitted from the infrastructure to the vehicle. The acknowledgement of the reception of the vehicle information is transmitted at the same frequency as the transmission of the vehicle information that is transmitted in step (3). Therefore, the acknowledgement of the reception of the vehicle information is used as a parameter to determine whether an error has occurred in communication between the vehicle and the infrastructure. For example, when the vehicle information does not reach the infrastructure at a specific time that is estimated according to the communication frequency, the infrastructure determines that an error has occurred in communication between the vehicle and the infrastructure.

In step (5), a target position and a guide route are delivered from the infrastructure to the vehicle. The delivery of the target position and the guide route may be performed either before or after an autonomous valet parking start instruction is transmitted from the infrastructure to the vehicle.

In step (6), driving area boundary information is transmitted to the vehicle from the infrastructure. The driving area boundary information includes landmarks (for examples, lines demarcating parking slots, a central line, and lane boundary lines demarcating a driving lane) that mark the boundaries of a permitted driving area. The transmission of the driving area boundary information is performed after the autonomous valet parking preparation instruction is delivered. This driving area boundary information is transmitted from the infrastructure to the vehicle in the form of a parking lot map.

In step (7), the autonomous valet parking start instruction is transmitted from the infrastructure to the vehicle. The transmission of the autonomous valet parking start instruction is performed after the guide route and the driving area boundary information are delivered. Alternatively, the autonomous valet parking start instruction is transmitted when the cause of the emergency braking is removed.

In step (8), an emergency braking instruction is transmitted to the vehicle from the infrastructure.

In step (9), a vehicle control release instruction is transmitted to the vehicle from the infrastructure. The delivery of the vehicle control release instruction is performed after the vehicle is autonomously parked at a parking slot.

Figure 6:
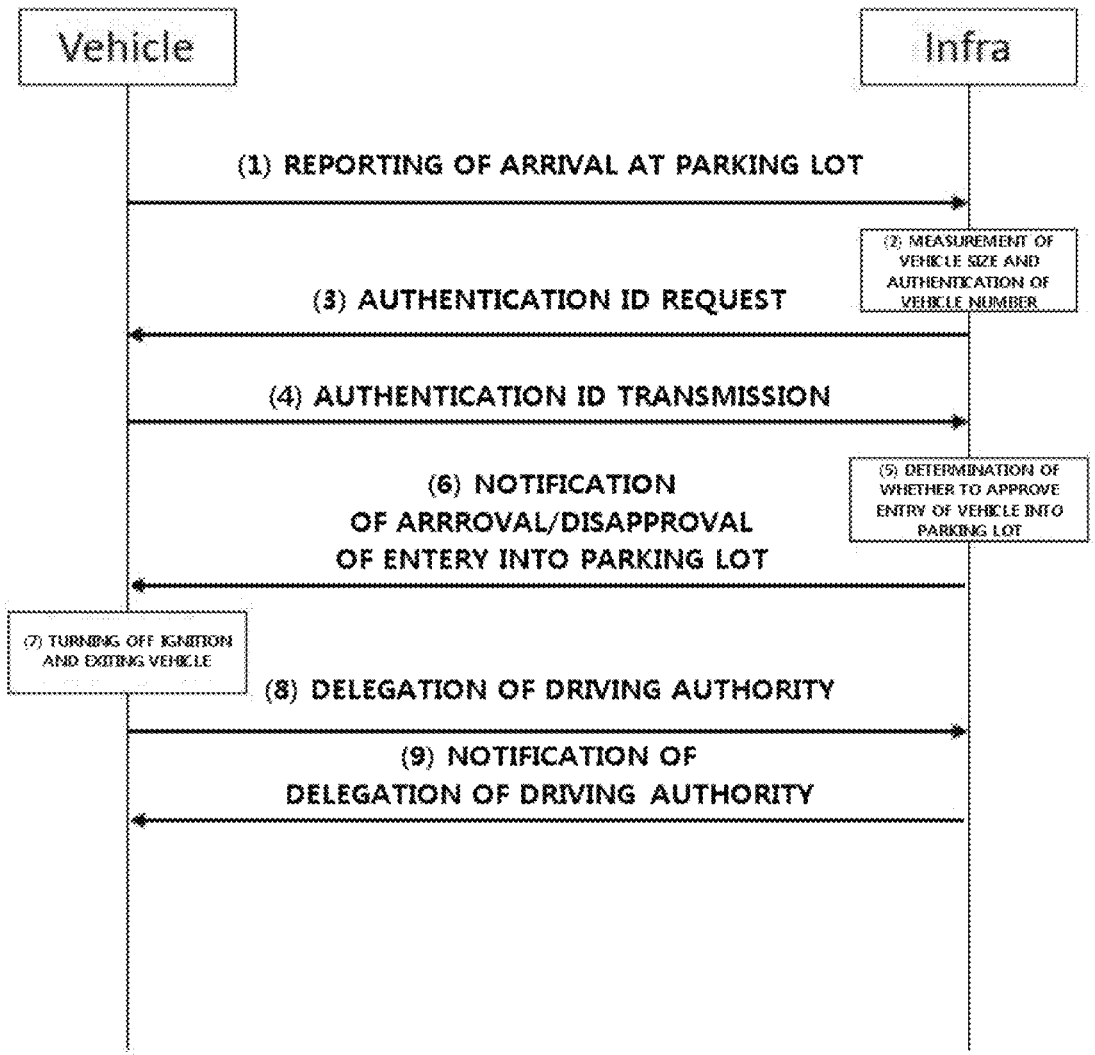
FIG. 6 is a diagram illustrating a communication process performed by a vehicle and a parking infrastructure for automated valet parking in one form of the present disclosure.

FIG. 6 is a diagram illustrating a communication process performed between a parking infrastructure 100 for automated valet parking and a vehicle 200.

In step (1), the vehicle 200 enters a parking lot and stops at a predetermined stop position. This stop position may be an entrance gate of a parking lot. The vehicle 200 reports its arrival to the infrastructure 100. In step (2), the infrastructure 100 measures the dimensions of the vehicle 200 and authenticates the vehicle 200 on the basis of an authentication ID of the vehicle 200. In step (3), the infrastructure 100 transmits an authentication ID submission request to the vehicle 200. In step (4), the vehicle 200 transmits the authentication ID to the infrastructure 100. In step (5), the infrastructure 100 determines whether to allow entry of the vehicle 200 into the parking lot on the basis of the received authentication ID. In step (6), the infrastructure 100 notifies the vehicle whether the vehicle 200 is permitted to enter the parking lot according to the results of the authentication. For example, the infrastructure 100 displays a message indicating approval or disapproval of the entry of the vehicle into the parking lot on a display panel installed around the stop position. The driver drives the vehicle 200 to a drop-off zone when the entry of the vehicle into the parking lot is approved. In step (7), the driver turns off the ignition of the vehicle 200, gets out of the vehicle 200, locks the vehicle doors, and leaves the drop-off zone. In step (8), the authority to drive the vehicle 200 is delegated from the vehicle 200 (or the driver) to the infrastructure 100. In addition, in step (9), the infrastructure 100 notifies the driver that it takes the authority to control the vehicle 200 in the parking lot. Such a notification is sent to a driver's smart device through a mobile communication network.

Figure 7:
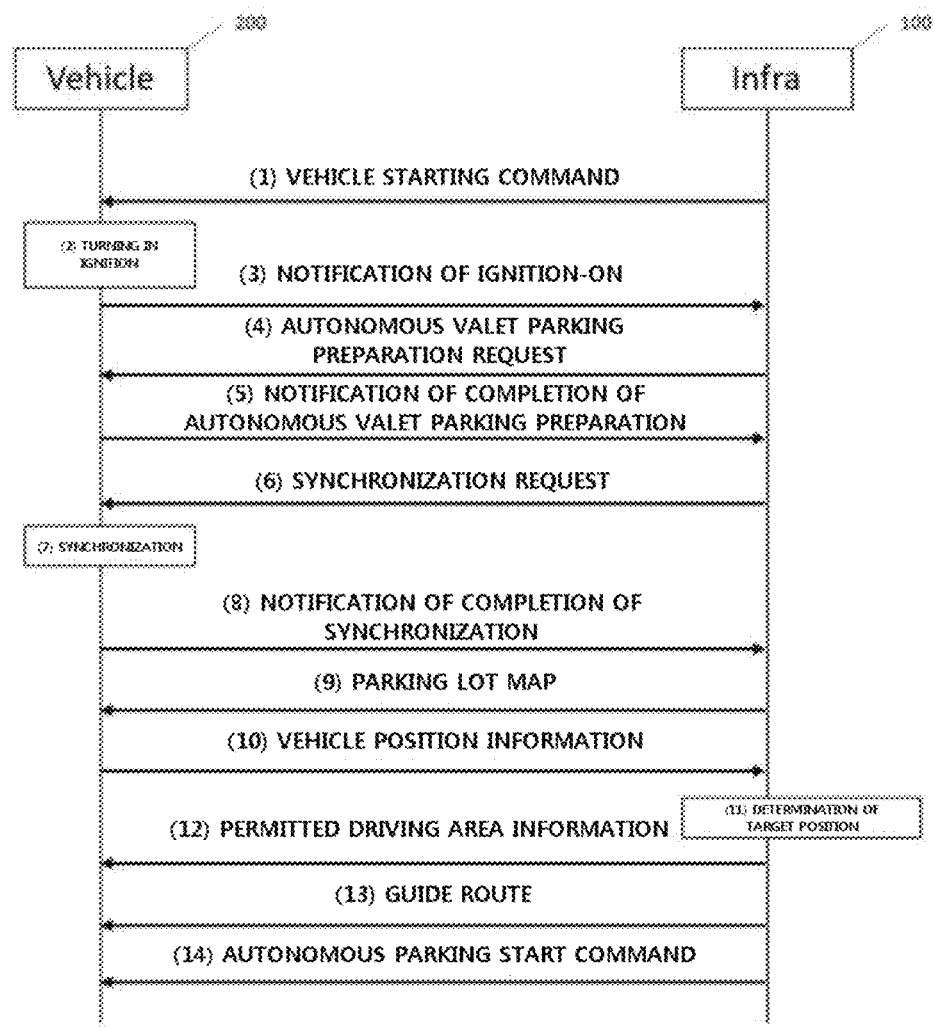
FIG. 7 is a diagram illustrating a communication process performed by a vehicle and a parking infrastructure for automated valet parking in one form of the present disclosure.

FIG. 7 is a diagram illustrating a communication process performed between a parking infrastructure 100 for automated valet parking and a vehicle 200.

In step (1), the infrastructure 100 transmits an ignition turning-on request to the vehicle 200. In step (2), the vehicle 200 turns on the ignition according to the ignition turning-on request transmitted from the infrastructure 100. In step (3), the vehicle 200 turns on the ignition and then notifies the infrastructure 100 that the ignition is turned on. In step (4), the infrastructure 100 transmits an automated valet parking preparation request to the vehicle 200. In step (5), the vehicle 200 transmits a reply to the automated valet parking preparation request to the infrastructure 100. The reply is a message of OK indicating that the preparation for automated valet parking is completed or a message of NG indicating that the preparation for automated valet parking is not completed. In step (6), the infrastructure 100 transmits a synchronization request to the vehicle 200. The synchronization request is a request for instructing synchronization of time such that the timer of the infrastructure 100 is synchronized with the timer of the vehicle 200. For example, the synchronization request includes information about time indicated by the timer of the infrastructure 100. In step (7), the vehicle 200 performs the synchronization according to the synchronization request. In step (8), the vehicle 200 transmits a reply indicating that the synchronization is completed to the infrastructure 100. For example, until the synchronization between the infrastructure 100 and the vehicle 200 is completed, a plurality of synchronization requests may be transmitted from the infrastructure 100 to the vehicle 200. In step (9), the infrastructure 100 transmits parking lot map information to the vehicle 200. The parking lot map information includes landmark information. In step (10), the vehicle 200 estimates or calculates the position of the vehicle 200 on the basis of the transmitted landmark information, and the vehicle 200 transmits the estimated position of the vehicle 200 to the infrastructure 100. In step (11), the infrastructure 100 determines a target position (for example, parking position). In step (12), the infrastructure 100 transmits information on a permitted driving area to the vehicle 200. For example, the infrastructure 100 transmits boundary information of the permitted driving area to the vehicle 200. In step (13), the infrastructure 100 transmits a guide route to the vehicle 200. In step (14), the infrastructure 100 transmits an automated valet parking start instruction to the vehicle 200.

Figure 8:
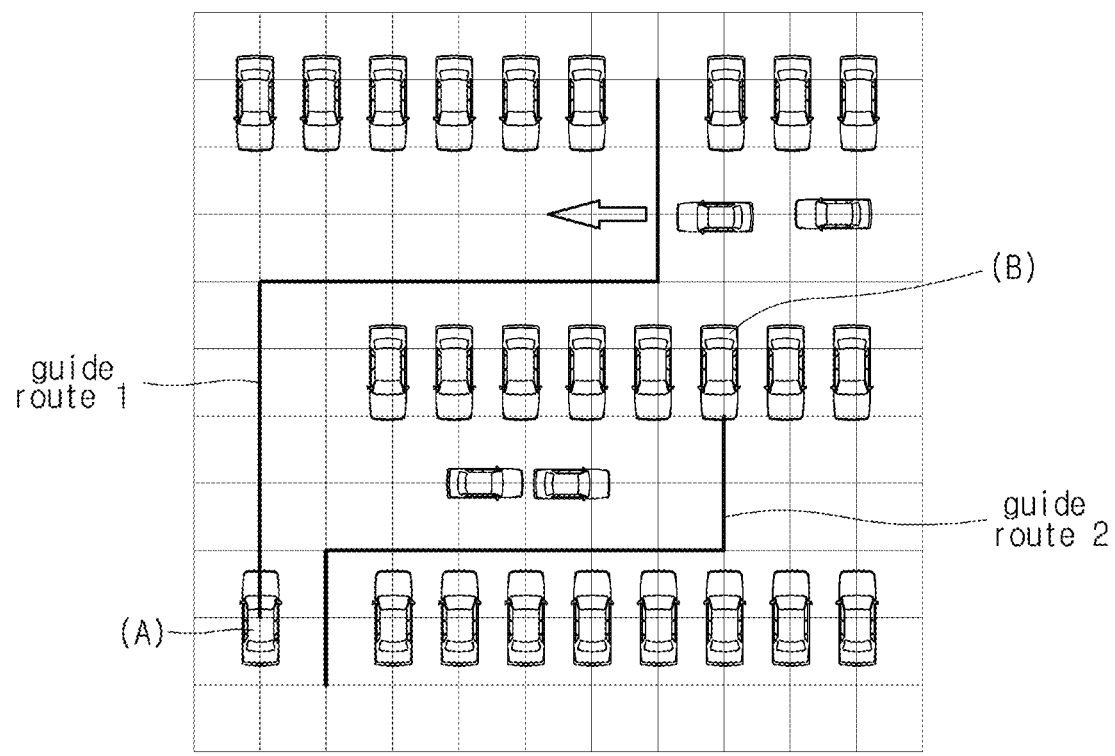
FIG. 8 is a view illustrating a guide route in one form of the present disclosure.

FIG. 8 is a view illustrating a guide route in some forms of the present disclosure.

Referring to FIG. 8, a first vehicle A autonomously drives along a first guide route 1 and a second vehicle B autonomously drives along a second guide route 2.

The first guide route 1 and the second guide route 2 are determined by the infrastructure and are transmitted to the first and second vehicles, respectively. According to the present disclosure, the first guide route 1 and the second guide route 2 are transmitted to the vehicles with the use of light-emitting devices. For example, the light-emitting devices are LED lamps. When the light-emitting devices illuminate, the guide routes are displayed on the ground surface. In this case, the light-emitting devices are LED lamps that are buried in the ground of the parking lot. Alternatively, the light-emitting devices may be laser lamps installed on the ceiling, the wall surface, or pillars in a manner that the laser lamps emit a laser beam toward the ground surface of the parking lot.

The vehicle detects illumination of the light-emitting devices with built-in sensors, thereby receiving or recognizing the guide route. For example, the vehicle may detect illumination of each of the light-emitting devices with the use of a front camera sensor.

As described above, when the guide routes are transmitted using the light-emitting devices, it is not necessary for the infrastructure to transmit information such as a parking lot map. That is, since the vehicles autonomously drive along the illumination of the light-emitting devices, it is not necessary for the vehicles to use a parking lot map to recognize the current locations of the vehicles or to recognize other vehicles or obstacles. Accordingly, according to the present disclosure, the amount of data to be transmitted to the vehicles can be reduced.

There may be multiple vehicles performing autonomous valet parking at the same time. Therefore, the light-emitting devices need to illuminate in a manner that the vehicles distinguish their guide router from the others.

To this end, the infrastructure may control illumination of the light-emitting devices using a frequency division scheme or a time division scheme. The details of illumination operations of the frequency division scheme and the time division scheme will be described with reference to FIG. 9.

Figure 9:
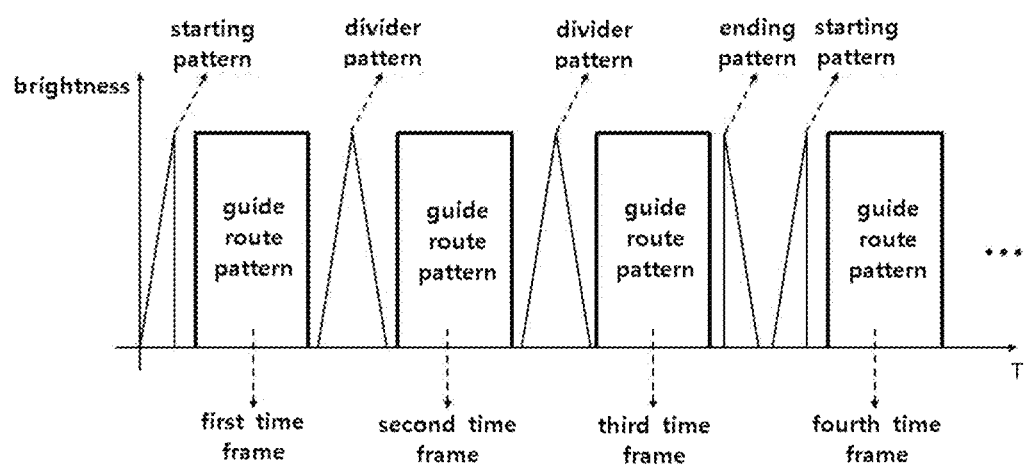
FIG. 9 is a view illustrating a time division scheme for providing a guide route in one form of the present disclosure.

FIG. 9 is a view illustrating a time division scheme for providing a guide route in some forms of the present disclosure.

Referring to FIG. 9, the abscissa axis and the ordinate axis indicate time and brightness, respectively. The present form is described with an example in which there are three vehicles to distinguish their guide route from the others. This form also applies to an example in which there are multiple vehicles other than 3.

A starting pattern first illuminates and a guide route pattern then follows the starting pattern. A time zone in which the guide route pattern following the starting pattern will be referred to as a first time frame.

After the first time frame, a divider pattern illuminates and the next guide route pattern follows the divider pattern. A time for which the guide route pattern following the divider pattern will be referred to as a second time frame.

After the second time frame, a divider pattern illuminates and the next guide route pattern follows the divider pattern. In this case, a time for which the guide route pattern following the divider pattern will be referred to as a third time frame.

After the third time frame, an ending pattern illuminates.

The starting pattern, the divider pattern, and the ending pattern are patterns that can be distinguished from each other. For example, they differ from each other in illumination time or in brightness value. For example, the starting pattern may have a brightness value that is up-rising, the divider pattern may have a brightness value that is increasing with time and then decreasing with time, and the ending pattern may have a brightness value that is decreasing with time. The guide route patterns may belong to the same time zone or different time zones.

The three vehicles are allocated the respective time frames by the infrastructure. For example, a first vehicle may be allocated a first time frame, a second vehicle may be allocated a second time frame, and a third vehicle may be allocated a third time frame. Each of the first through third vehicles recognizes the light ray emitted for a corresponding time frame of the first through third time frames as its guide route.

For example, the first vehicle recognizes the guide route pattern that illuminates after the starting pattern as its guide route and neglects the other guide route patterns. That is, when the first vehicle recognizes the starting pattern, it recognizes the next guide route pattern as its guide route. That is, when the first vehicle recognizes the guide route pattern that illuminates within the first time frame as its guide route.

The second vehicle recognizes the guide route pattern that illuminates after the first divider pattern as its guide route and neglects the other guide route patterns. That is, when the second vehicle recognizes the starting pattern, it waits for the first divider pattern illuminating and then recognizes the next guide route pattern following the first divider pattern as its guide route. That is, when the second vehicle recognizes the guide route pattern that illuminates within the second time frame as its guide route.

The third vehicle recognizes the guide route pattern that illuminates after the second divider pattern as its guide route and neglects the other guide route patterns. That is, when the third vehicle recognizes the starting pattern, it waits for the second divider pattern illuminating and then recognizes the next guide route pattern following the second divider pattern as its guide route. That is, when the third vehicle recognizes the guide route pattern that illuminates within the third time frame as its guide route.

When recognizing the ending pattern, the first vehicle, the second vehicle, and the third vehicle wait for the next starting pattern illuminating.

As described above, each of the vehicles can recognize a corresponding guide route of the guide routes in a time divisional manner. Alternatively, the guide routes can be distinguished in a frequency divisional manner. The frequency division scheme is configured such that vehicles are allocated respectively different frequency bands and each of the vehicles recognizes an illumination of a corresponding one of multiple the frequency bands as its guide route.

Figure 10:
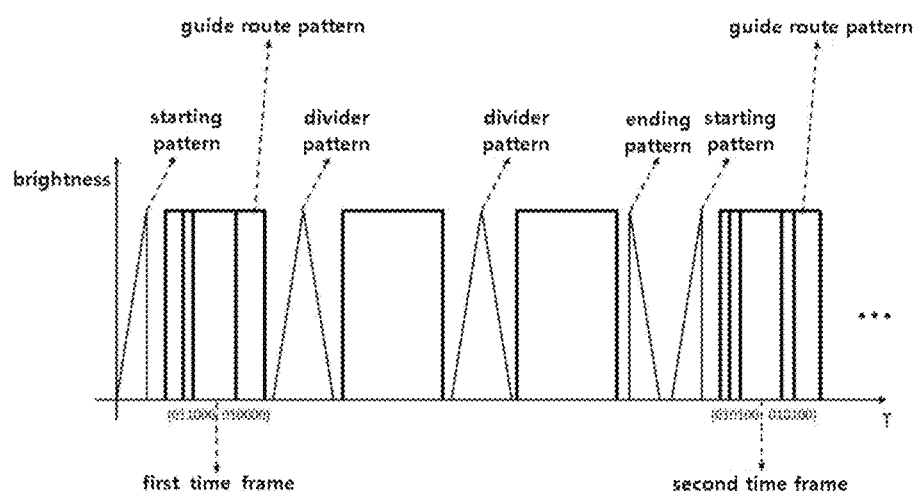
FIG. 10 is a diagram illustrating a method of transferring information according to a time divisional guide route in one form of the present disclosure.

FIG. 10 is a diagram illustrating a method of transferring information according to a time divisional guide route in some forms of the present disclosure.

In FIG. 10, the abscissa axis and the ordinate axis indicate time and brightness, respectively. The present form is based on an example in which three vehicles distinguish their guide route and a guide route for a first vehicle is transmitted within a first time frame that follows a starting pattern.

According to the present disclosure, a binary pattern may be transmitted when the guide route pattern illuminates within the first time frame. For example, during the first time frame, 6-bit binary codes of 011000 and 010000 are transmitted.

The binary pattern may be a control instruction for the vehicle. For example, each of the vehicles and the infrastructure has a database in which binary patterns and control instructions are matched. Thus, when a specific vehicle receives a binary pattern, the vehicle performs a control instruction corresponding to the received binary pattern. The control instructions are related to respective vehicle operations such as turning left, turning right, accelerating, decelerating, locking doors, unlocking doors, etc. For example, a combination of binary patterns of 0110000 and 010000 corresponds to an instruction of emergency braking. This emergency braking instruction can also be transmitted in the other time frames (i.e., the second time frame and the third time frame). Therefore, each of the vehicles that are performing autonomous valet parking in the parking lot can apply an emergency brake in response to the instruction.

In addition, the binary pattern may indicate a target position for a vehicle. For example, the infrastructure may transmit a binary pattern indicating a target position to a corresponding vehicle having a parking lot map. After the vehicle receives the binary pattern indicating the target position, the vehicle can autonomously drive to the target position.

In some forms of the present disclosure, the described functions may be implemented in the form of hardware, software, firmware, or any combination thereof. When implemented in the form of software, these functions may be stored on or transmitted to a computer-readable medium in the form of one or more instructions or codes. The computer-readable medium refers to any medium that can transfer a computer program from one computer to another. For example, it may be a communication medium or a computer-readable storage medium. The storage medium may be an arbitrary medium that can be accessed by a computer. The computer-readable media include, not limitedly, RAMs, ROMs, EEPROMs, optical discs such as CD-ROM, magnetic disks, and any media that can be accessed by computers and which can be used to transfer a computer program in the form of instructions from one place to another. The computer-readable media are appropriately referred to as media that can be arbitrarily accessed by computers. For example, software can be transferred from a website, server or other remote sources through a cable or over a wireless channel. Examples of the cables include coaxial cable, fiber optic cable, twisted pair cable, and digital subscriber line (DSL). Examples of the wireless channel include infrared frequency waves, radio frequency waves, and ultrahigh frequency waves. In this case, the coaxial cable, the fiber optic cable, the twisted pair cable, the DL, and the wireless channels fall within the definition of the medium. The disks or discs include a compact disc (CD), a laser disc (LD), an optical disc (OD), a digital versatile disc (DVD), a floppy disk (FD), and a Blu-ray disc. Discs generally refer to media from which data is optically read and disks refer to media from which data is magnetically read. Combinations of the above-mentioned media also fall within the definition of the computer-readable medium.

When some forms of the present disclosure are implemented as program code or code segments, the code segment may be a procedure, function, subprogram, program, routine, subroutine, module, software package, class, instructions, data structures, program command strings, or an arbitrary set of program command strings. One code segment may be connected with another code segment or a hardware circuit in a manner of transmitting and receiving information, data, arguments, parameters, or memory content. Information, arguments, parameters, data, and the like may be delivered, sent, or transmitted using any suitable means such as memory sharing, message delivery, token delivery, network transmission, and the like. In addition, in some aspects, steps and/or operations of a method or algorithm may reside on a mechanically readable medium and/or a computer-readable medium in the form of a combination or set of one or more codes and/or one or more instructions that can be integrated into a computer program product.

When implemented as software, the techniques described herein can be implemented as modules (for examples, procedures, functions, etc.) that perform the functions described herein. Software codes may be stored in a memory unit and may be executed by a processor. The memory unit may be embedded in a processor or may be provided outside a processor. In this case, the memory unit may be communicatively connected with the processor by various means known in the art.

When implemented as hardware, processing units may be implemented as one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, electronic devices designed to perform the functions described herein, or any combination of these.

The above-mentioned ones include some forms of the present disclosure. Of course, the above-described forms do not cover all possible combinations of components and/or methods to implement some forms of the present disclosure. Thus, those skilled in the art will appreciate that many further combinations and substitutions of components and/or methods in various forms of the present disclosure are possible. Accordingly, the above-described forms of the present disclosure cover all such alterations, modifications, and variations that fall within the spirit and scope of the appended claims. Moreover, as to the scope of the terms "comprises" used in the detailed description or the appended claims, it is noted that it is similarly interpreted as "comprising" that is used as a transitional word in the claims.

As used herein, the term "infer" or "inference" generally refers to a process of determining or inferring a state of a system, environment, and/or user from a set of observations of events and/or data. Inferring can be used to identify a specific situation or action, or can generate a probability distribution of certain states, for example. Inferring is probabilistic. That is, inferring may mean a calculation of a probability distribution of those states, based on study on data and events. Inferring may involve techniques used to construct a higher level event from a set of events and/or data. The inference refers to a process of inferring new events or actions from a set of observed events and/or stored event data, determining whether events are closely correlated in time, and determining whether the events and data come from one or several events and data sources.

Moreover, terms such as "component", "module", and "system" used herein may refer to, not necessarily, computer entities such as hardware, firmware, any combination of hardware and software, software, and a software program being executed. For example, the term "component" may refer to, not necessarily, a process running on a processor, a processor, an object, an executable execution thread, a program, and/or a computer. By way of illustration, both an application running on a computing device and the computing device itself may fall within the definition of the component. One or more components may reside within a process and/or an execution thread. One or more components may be collectively provided in one computer or distributed in two or more computers. In addition, these components can be executed on various computer readable media having various data structures stored thereon. Components can communicate a signal containing one or more data packets (for example, data from an arbitrary component that interacts with a local system, a component of a distributed system, and/or other systems on the basis of a signal that is transmitted over a network such as Internet) with a local and/or remote process.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for an automated valet parking comprising:
   transmitting, by a parking infrastructure, a target position and a guide route to a corresponding vehicle of a plurality of vehicles;
   performing, by the corresponding vehicle, autonomous driving toward the target position along the guide route; and
   performing, by the corresponding vehicle, autonomous parking at the target position,
   wherein the parking infrastructure is configured to transmit the guide route to the corresponding vehicle through a light-emitting device installed in a parking lot,
   wherein the corresponding vehicle is configured to detect an illumination of the light-emitting device by using a built-in sensor, and
   wherein transmitting the target position and the guide route to the corresponding vehicle of the plurality of vehicles comprises:
   allocating, by the parking infrastructure, different time frames to the plurality of vehicles; and
   controlling illumination of the light-emitting device based on a time division scheme which provides respective guide routes to the plurality of vehicles at the different time frames allocated to the plurality of vehicles,
   wherein the corresponding vehicle checks a time frame allocated to the corresponding vehicle by the parking infrastructure among the different time frames, and detects the illumination of the light emitting device only during the time frame allocated to the corresponding vehicle.

2. The method of claim 1, wherein the different time frames allocated to the plurality of vehicles are periodically repeated, and wherein one period includes the different time frames allocated to the plurality of vehicles, and the one period is distinguished by a starting pattern and an ending pattern.

3. The method of claim 2, wherein the different time frames are distinguished by at least one divider pattern.

4. The method of claim 3, wherein the corresponding vehicle obtains the guide route based on the detected illumination.

5. The method of claim 3, wherein controlling illumination of the light-emitting device based on the time division scheme further comprises:
- illuminating, by the light-emitting device, the starting pattern;
- illuminating, by the light-emitting device, a first pattern indicating a first guide route of a first vehicle at a first time frame of a corresponding period after illuminating the starting pattern;
- illuminating, by the light-emitting device, the divider pattern after illuminating the first pattern indicating the first guide route; and
- illuminating, by the light-emitting device, a second pattern indicating second guide route of a second vehicle at a second time frame of the corresponding period after illuminating the divider pattern,
- wherein each of the first pattern and the second pattern includes a binary pattern.

6. The method of claim 5, wherein the binary pattern indicates a control instruction for the corresponding vehicle.

7. The method of claim 6, wherein the binary pattern indicates an emergency braking instruction for the corresponding vehicle.

8. The method of claim 5, wherein the binary pattern indicates the target position for the corresponding vehicle.

9. The method of claim 1, wherein the built-in sensor comprises a camera sensor.

10. The method of claim 1, wherein the light-emitting device is a light-emitting diode (LED) lamp installed in a ground of the parking lot.

11. The method of claim 1, wherein the method comprises:
- detecting, by the corresponding vehicle, a light ray emitted toward a ground surface from a laser lamp, wherein the light-emitting device is the laser lamp attached to a ceiling, a wall surface, or a pillar in the parking lot.

12. An apparatus for an automated valet parking, the apparatus comprising:
- a processor configured to perform computations; and
- a light-emitting device installed in a parking lot and configured to emit a light ray,
- wherein the processor is further configured to:
  - determine respective guide routes that guide a plurality of vehicles to respective target positions;
  - allocate different time frames to the plurality of vehicles; and
  - control illumination of the light-emitting device based on the determined guide routes and a time division scheme which provides the respective guide routes to the plurality of vehicles at the different time frames allocated to the plurality of vehicles.

13. The apparatus of claim 12, wherein the different time frames allocated to the plurality of vehicles are periodically repeated, and wherein one period includes the different time frames allocated to the plurality of vehicles, and the one period is distinguished by a starting pattern and an ending pattern.

14. The apparatus of claim 13, wherein the different time frames are distinguished by at least one divider pattern.

15. The apparatus of claim 14, wherein the light-emitting device is further configured to:
- illuminate the starting pattern;
- illuminate a first pattern indicating a first guide route of a first vehicle at a first time frame of a corresponding period after illuminating the starting pattern;
- illuminate the divider pattern after illuminating the pattern indicating the first guide route; and
- illuminate a second pattern indicating a second guide route of a second vehicle at a second time frame of the corresponding period after illuminating the divider pattern,
- wherein each of the first pattern and the second pattern includes a binary pattern.

16. The apparatus of claim 15, wherein the binary pattern indicates a target position for the corresponding vehicle.

17. The apparatus of claim 12, wherein the light-emitting device is a light-emitting diode (LED) lamp installed in a ground of the parking lot.

* * * * *